Patented Sept. 29, 1925.

1,555,798

UNITED STATES PATENT OFFICE.

JAMES H. GRAVELL, OF ELKINS PARK, PENNSYLVANIA.

METAL PICKLING.

No Drawing.  Application filed December 13, 1923.  Serial No. 680,353.

*To all whom it may concern:*

Be it known that I, JAMES H. GRAVELL, a citizen of the United States, residing at Elkins Park, in the county of Montgomery and State of Pennsylvania, have invented certain new and useful Improvements in Metal Pickling, of which the following is a specification.

This invention relates to improvements in neutralizing and preventing from rusting, acid treated steel and iron, and it is particularly directed to improvements in the step in the pickling of iron and steel known as neutralizing.

Objects of the invention are to neutralize the free acid remaining on the work from the pickling process; to change the metallic salts resulting from the pickling and adhering to the work to nonoxidizable bodies which will not cause rusting; to protect the pickled work against the rusting influences of the atmosphere; to enable the carbon deposit from the pickling operation to be easily removed, and to protect the pickled work from oxidizing in subsequent operations.

In order to remove scale and rust from iron and steel it is treated with dilute acids. This operation is known as pickling. If the pickling acids are not removed from the metal or neutralized, a corrosive action sets in which produces undesirable results. Heretofore in order to oppose the occurrence of these undesirable results, the metal was treated usually with lime water in an effort to neutralize the after effects of the pickle. The lime converts the free acid to calcium salts and also converts the iron salts, resulting from the pickle, into metal hydrates, which in the case of iron and steel slowly oxidize into rust, indicating that lime is only a temporary expedient. And further, in pickling steel a black or dark surface, usually referred to as a carbon deposit, is formed or exposed on the work and should be removed before subsequent metal working operations, such as drawing, are performed, otherwise the carbon deposit is pressed into the metal causing the metal to look dark. When lime is used for neutralizing, the carbon deposit is "set" so to speak, so that it becomes a difficult matter to remove it.

I have discovered that sodium silicate or water glass or soluble glass can be used instead of lime in the neutralizing step of the pickling process to great advantage. When sodium silicate is used as the neutralizing agent, the iron salts resulting from the pickling operation are converted into insoluble silicates which do not oxidize to rust and rust forming materials; the work is coated with a skin or coating which protects the metal against the rusting influences of the atmosphere and against the oxidizing influence of subsequent heating and drying operations. This skin-like material attaches itself to the carbon deposit resulting from the pickling operation and the carbon deposit is removed from the metal along with the coating or skin-like material in subsequent metal working operations such, for instance, as drawing.

To practice my improvement in the pickling process, I prepare a solution of sodium silicate and water, and after pickling the metal in the regular way, I wash the metal in water to remove as much of the spent pickle as possible and then treat the metal with my solution by dipping, spraying or brushing. A practical solution may be made by using sodium silicate (commercial), 1 gallon; water, 7 gallons.

The solution however may be made stronger or weaker with the silicate as desired in order to make a thicker or thinner coating. The solution may be used hot or cold but is preferably used hot as then the work dries quickly.

My solution can be used to advantage generally for neutralizing the effects of free acids and corrosive salts, on metal, iron or steel surfaces, that is where soldering solutions are used, where the metal has been cleaned with deoxidine (alcohol and phosphoric acid) and where a substantial coating of iron phosphate has been formed on the steel (Coslett process).

If desired a color in the form of a soluble dye or insoluble pigment can be added to my solution in quantity sufficient to give a distinct color to my coating. This is of special advantage when treating steel prepared by the Coslett process.

Metal treated according to my process can be distinguished from metal not so treated by its smooth and semi-glossy appearance and resistance to rusting influences.

It will be obvious to those skilled in the art that modifications may be made in details of procedure and in mere matters of form without departing from the spirit of the invention which is not limited as to such matters or otherwise than as the prior art and the appended claims may require, reserving the doctrine of equivalents applicable to chemical cases of which this is one.

I claim:

1. In metal acid pickling the step which consists in treating the metal with sodium silicate.

2. The process of neutralizing acid pickled metal which consists in treating the pickled metal with sodium silicate.

3. The process of neutralizing acid treated metal which consists in converting the metal salts on the metal which result from the acid treatment into silicates by treating the metal with a solution of water glass.

4. The process of preventing acid pickled metal from rusting which consists in treating the said metal with sodium silicate dissolved in water.

5. The process of preventing pickled metal from rusting and removing the carbon deposit from the same, consisting in treating the pickled metal from sodium silicate, and subjecting the treated metal to a metal working operation which removes the sodium silicate and along with it, the carbon deposit.

6. A bath for neutralizing acid pickled metal, one ingredient of which is sodium silicate.

7. A bath for neutralizing and coloring acid pickled metal consisting of an admixture of sodium silicate and a coloring material.

8. A new article of manufacture consisting of acid etched metal coated with sodium silicate.

9. A new article of manufacture consisting of acid etched metal coated and colored with an admixture one ingredient of which is sodium silicate.

10. In metal acid pickling the improvement which consists in subjecting the pickled metal to the action of a solution of soluble silicate of an alkaline earth metal, substantially as described.

11. In metal pickling the improvement which consists in subjecting the pickled metal to the action of a saline bath adapted by double decomposition with the acid of the pickle to form stable salts of the metal.

JAMES H. GRAVELL.